United States Patent
Gu et al.

(10) Patent No.: US 7,860,493 B2
(45) Date of Patent: Dec. 28, 2010

(54) METHOD OF TRANSMITTING DATA THROUGH MOBILE COMMUNICATION EQUIPMENT AND MOBILE COMMUNICATION EQUIPMENT UTILIZING THE METHOD

(75) Inventors: Ping Gu, Nanking (CN); Cheng-Shing Lai, Taipei (TW)

(73) Assignee: Inventec Appliances Corp., Taipei (TW)

( * ) Notice: Subject to any disclaimer, the term of this patent is extended or adjusted under 35 U.S.C. 154(b) by 892 days.

(21) Appl. No.: 11/798,880

(22) Filed: May 17, 2007

(65) Prior Publication Data

US 2008/0159296 A1 Jul. 3, 2008

(30) Foreign Application Priority Data

Dec. 29, 2006 (TW) .............................. 95150076 A

(51) Int. Cl.
*H04M 3/00* (2006.01)
(52) U.S. Cl. .................... 455/418; 455/550.1; 455/414; 455/466; 455/425; 455/552.1; 709/206
(58) Field of Classification Search ............. 370/395.3; 455/550.1, 414, 466, 412.1, 425, 552.1
See application file for complete search history.

(56) References Cited

U.S. PATENT DOCUMENTS 5,751,905 A * 5/1998 Chen et al. .................. 704/254
6,424,945 B1 * 7/2002 Sorsa ........................ 704/270.1
6,453,172 B1 * 9/2002 Miyashita ................ 455/552.1
7,289,606 B2 * 10/2007 Sibal et al. ..................... 379/52
7,523,479 B2 * 4/2009 Briggs et al. ................. 725/100
2005/0163229 A1 * 7/2005 Okada et al. ........... 375/240.28

* cited by examiner

*Primary Examiner*—Kamran Afshar
*Assistant Examiner*—Khalid Shaheed
(74) *Attorney, Agent, or Firm*—Birch, Stewart, Kolasch & Birch, LLP

(57) ABSTRACT

The invention provides a method for transmitting data through mobile communication equipment. The mobile communication equipment has a first communication mode and a second communication mode. In the method, it is first determined whether the mobile communication equipment is required to transmit the data by the first communication mode or the second communication mode, wherein the data conforms to a first format related to the first communication mode. Subsequently, when the mobile communication equipment is required to transmit the data by the second communication mode, the data is adjusted according to a second format related to the second communication mode to generate an adjusted data. The adjusted data is then transmitted by the second communication mode.

20 Claims, 3 Drawing Sheets

METHOD OF TRANSMITTING DATA THROUGH MOBILE COMMUNICATION EQUIPMENT AND MOBILE COMMUNICATION EQUIPMENT UTILIZING THE METHOD

BACKGROUND OF THE INVENTION

1. Field of the Invention

This present invention relates to a method of transmitting data and, more particularly, to a method of transmitting data through mobile communication equipment.

2. Description of the Prior Art

In recent years, the rapid growth of wireless communication techniques allows various wireless networks to be available in the same region. At present, besides traditional GSM networks, which have been extensively used, CDMA and PHS networks are also used in many regions. Current cell phones with dual mode or multi-mode in the market can only transmit data with format related to one communication mode through that communication mode but not of the other communication mode. For example, a PHS/GSM cell phone of dual mode can only transmit a message of PHS format through PHS communication mode, but not through GSM communication mode. This drawback not only causes users inconvenience but also restricts the advantage of dual mode or multi-mode cell phones.

The reason that the cell phones of dual mode or multi-mode are not capable of realizing the aforementioned function is that data formats vary with communication networks. For example, the regulation of the GSM communication mode is that the number of words in a Chinese message is no more than 70, and the number of words in an English message is no more than 160. The regulation of the PHS communication mode is that the number of words in both Chinese and English messages is no more than 116.

To solve the aforementioned problem, a scope of the invention is to provide a method of transmitting data through mobile communication equipment.

SUMMARY OF THE INVENTION

A scope of the invention is to provide mobile communication equipment and a method of transmitting data through mobile communication equipment. The mobile communication equipment has a first communication mode and a second communication mode. Assuming that the data conforms to a first format related to the first communication mode, the mobile communication equipment according to the invention can transmit the data through the second communication mode. On the other hand, assuming that the data conforms to a second format related to the second communication mode, the mobile communication equipment according to the invention can transmit the data through the first communication mode.

In an embodiment according to the invention, the mobile communication equipment has a first communication mode and a second communication mode, and is capable of transmitting data. The data conforms to a first format related to the first communication mode. The mobile communication equipment includes a determining module, an adjusting module, and a transmitting module. The determining module is for determining whether the mobile communication equipment is required to transmit the data by the first communication mode or the second communication mode. When the mobile communication equipment is required to transmit the data by the second communication mode, the adjusting module adjusts the data according to a second format related to the second communication mode to generate an adjusted data. Then, the transmitting module transmits the adjusted data by the second communication mode.

In another embodiment according to the invention, a method of transmitting data through mobile communication equipment is provided. The mobile communication equipment has a first communication mode and a second communication mode. In the method, it is first determined whether the mobile communication equipment is required to transmit the data by the first communication mode or the second communication mode, wherein the data conforms to a first format related to the first communication mode. Subsequently, when the mobile communication equipment is required to transmit the data by the second communication mode, the data is adjusted according to a second format related to the second communication mode to generate an adjusted data. The adjusted data is then transmitted by the second communication mode.

No matter the data conforms to a format related to the first communication mode or the second communication mode, the mobile communication equipment according to the invention can transmit data through the communication mode determined by a user. Thus, freer and more convenient communication services can be provided to users.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1A:
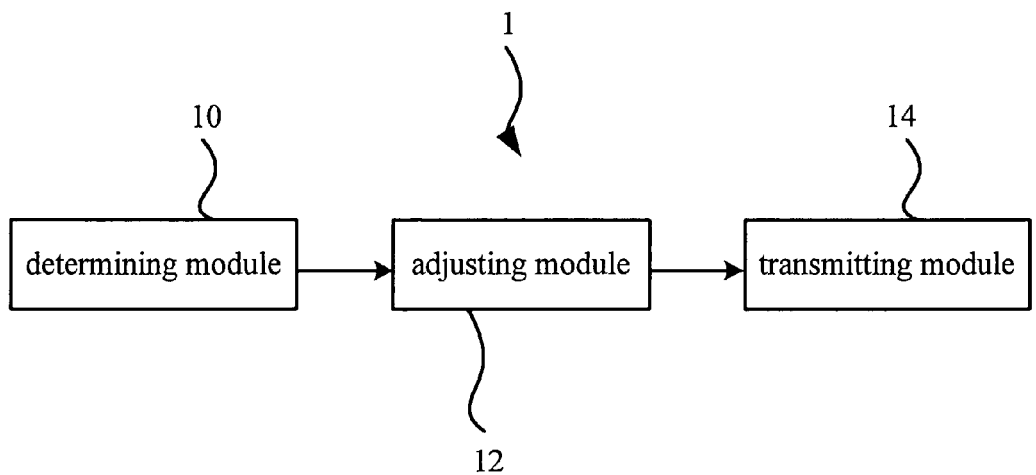
FIG. 1A is a function block diagram of mobile communication equipment according to a first preferred embodiment of the invention.

Referring, to FIG. 1A, FIG. 1A is a function block diagram of the mobile communication equipment 1 according to a first preferred embodiment of the invention. The mobile communication equipment 1 has a first communication mode and a second communication mode and is capable of transmitting data. In the embodiment, the data is assumed to conform to a first format related to the first communication mode.

In practical application, the first communication mode can be a PHS mode or a CDMA mode, and the second communication mode can be a GSM mode. In addition, the mobile communication equipment 1 can have two or more modes. The modes can be a combination of CDMA, GSM, PHS, CDMA2000, WCDMA or Wi-Fi.

As shown in FIG. 1A, the mobile communication equipment includes a determining module 10, an adjusting module 12, and a transmitting module 14. The determining module 10 is for determining whether the mobile communication equipment 1 is required to transmit the data by the first communication mode or the second communication mode. When the mobile communication equipment 1 is required to transmit the data by the second communication mode, the adjusting module 12 adjusts the data according to a second format related to the second communication mode to generate an adjusted data. Then, the transmitting module 14 transmits the adjusted data by the second communication mode. In one embodiment, when the mobile communication equipment 1 is required to transmit the data by the first communication mode, the transmitting module 14 can transmit the data directly by the first communication mode.

For example, assume the mobile communication equipment 1 is a PHS/GSM cell phone of dual mode. When a user decides to transmit a message conforming to the PHS format through the GSM communication mode, the adjusting module 12 adjusts the message according to a format related to the GSM communication mode, so as to make the adjusted message conform to the format related to the GSM communication mode. When a user decides to transmit the message through the PHS communication mode, the adjusting module 12 does not need to adjust the message, and the transmitting module 14 can transmit the data directly by the PHS communication mode.

Figure 1B:
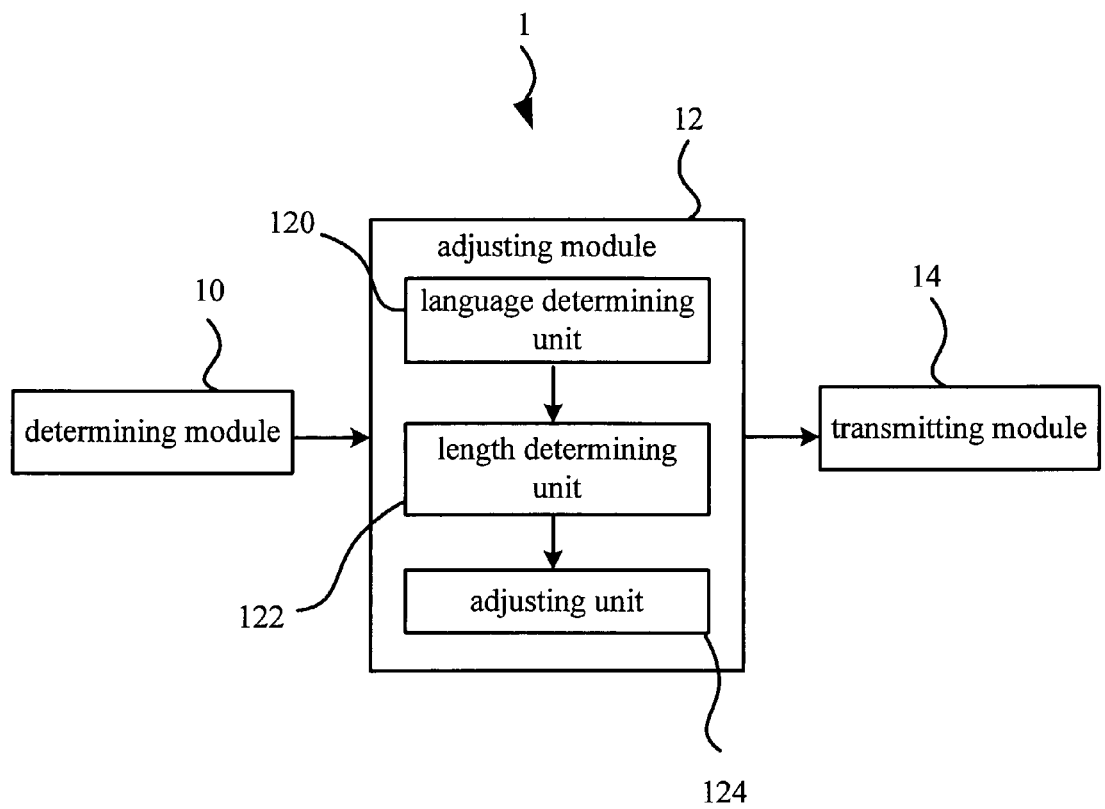
FIG. 1B is a function block diagram of mobile communication equipment according to a second preferred embodiment of the invention.

Referring to FIG. 1B, FIG. 1B is a block diagram of mobile communication equipment 1 according to a second preferred embodiment of the invention. As shown in FIG. 1B, the adjusting module 12 can further include a language determining unit 120, a length determining unit 122, and an adjusting unit 124.

The language determining unit 120 is for determining whether a language of the data is a first language or a second language. When the language of the data is the first language, and the mobile communication equipment 1 is required to transmit the data by the second communication mode, the length determining unit 122 then determines whether a length of the data is longer than a first length in the second format. When the length of the data is longer than the first length, the adjusting unit 124 divides the data into a first data and a second data according to the first length. The adjusted data generated by the adjusting module 12 includes the first data and the second data. When the length of the data is shorter than or equivalent to the first length, the adjusting module 12 can directly set the data as the adjusted data. In other words, the data does not need to be adjusted.

For example, assume that the first language is Chinese, the second language is English, and the mobile communication equipment 1 is required to transmit a Chinese message of PHS format by the GSM (second) communication mode. When the Chinese message has 120 Chinese words, the adjusting unit 124 can divide the Chinese message into a first sub-message (first data) having the former 70 Chinese words and a second sub-message (second data) having the latter 50 Chinese words because a Chinese message of GSM (second) format can only have 70 (first length) Chinese words.

In one embodiment, when the language of the data is the second language, and the mobile communication equipment 1 is required to transmit the data by the second communication mode, the length determining unit 122 then determines whether the length of the data is longer than a second length in the second format. When the length of the data is longer than the second length, the adjusting unit 124 divides the data into a third data and a fourth data according to the second length. The adjusted data generated by the adjusting module 12 includes the third data and the fourth data. When the length of the data is shorter than or equivalent to the second length, the adjusting unit 124 can directly set the data as the adjusted data. In other words, the data does not need to be adjusted.

In another embodiment, when the language of the data is a combination of the first language and the second language, and the mobile communication equipment 1 is required to transmit the data by the second communication mode, the length determining unit 122 determines whether the length of the data is longer than a third length in the second format.

When the length of the data is longer than the third length, the adjusting unit 124 divides the data into a fifth data and a sixth data according to the third length. The adjusted data generated by the adjusting module 12 includes the fifth data and the sixth data. When the language of the data is a combination of the first language and the second language with the length of the data shorter than or equivalent to the third length, the adjusting unit 124 can directly set the data as the adjusted data. In other words, the data does not need to be adjusted.

In practical application, the first language and the second language can be other languages, and not limited by Chinese or English in the aforementioned examples.

Figure 2A:
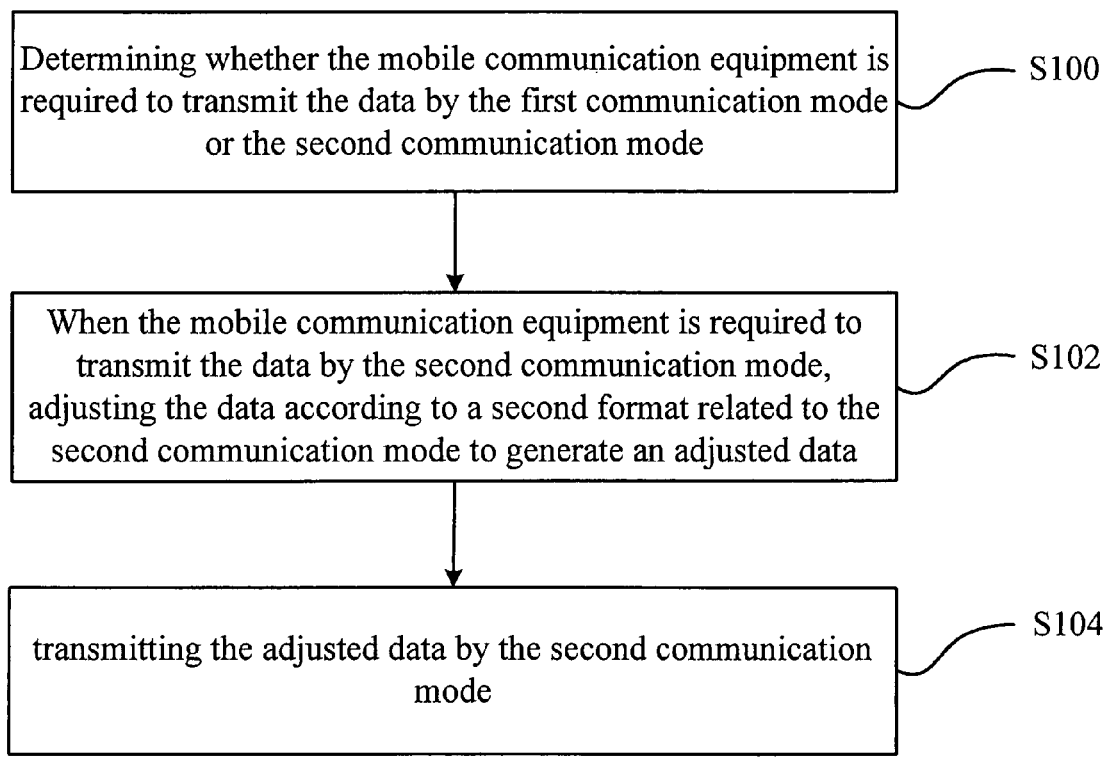
FIG. 2A is the flowchart of the method according to a third preferred embodiment of the invention.

In a third preferred embodiment according to the invention, a method of transmitting data through mobile communication equipment is provided. Referring to FIG. 2A, FIG. 2A is the flowchart of the method. Mobile communication equipment 1 has a first communication mode and a second communication mode. The data conforms to a first format related to the first communication mode.

As shown in FIG. 2A, whether the mobile communication equipment 1 is required to transmit the data by the first communication mode or the second communication mode is determined in step S100. In step S102, when the mobile communication equipment 1 is required to transmit the data by the second communication mode, the data is adjusted according to a second format related to the second communication mode to generate an adjusted data. Then, in step S104, the adjusted data is transmitted by the second communication mode.

Figure 2B:
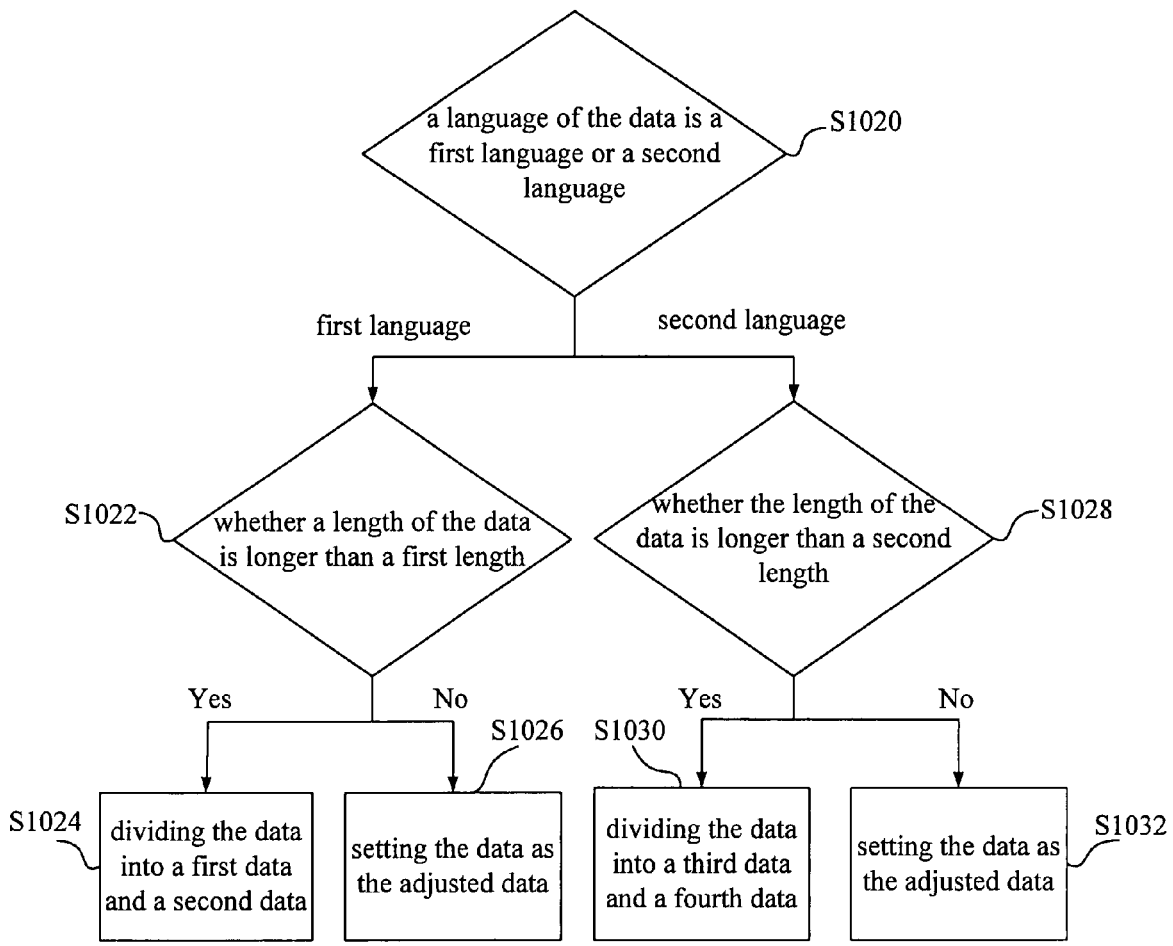
FIG. 2B is the flowchart of the method in practical application.

Referring to FIG. 2B, in practical application, step S102 in FIG. 2A can include sub-steps S1020 to S1032.

When the mobile communication equipment 1 is required to transmit the data by the second communication mode, whether a language of the data is a first language or a second language will be determined in step S1020. Whether a length of the data is longer than a first length in the second format will be determined in step S1022 when the language of the data is the first language. When the length of the data is longer than the first length, the data will be divided into a first data and a second data according to the first length in step S1024. When the length of the data is shorter than or equivalent to the first length, the data will be directly set as the adjusted data in step S1026. Whether the length of the data is longer than a second length in the second format will be determined in step S1028 when the language of the data is the second language. When the length of the data is longer than the second length, the data will be divided into a third data and a fourth data according to the second length in step S1030. When the length of the data is shorter than or equivalent to the second length, the data will be directly set as the adjusted data in step S1032.

In addition, when the language of the data is a combination of the first language and the second language (not shown in FIG. 2B), whether the length of the data is longer than a third length in the second format is determined. When the length of the data is longer than the third length, the data will be divided into a fifth data and a sixth data according to the third length. When the length of the data is shorter than or equivalent to the third length, the data will be directly set as the adjusted data.

No matter the data conforms to a format related to the first communication mode or the second communication mode, the mobile communication equipment according to the invention can transmit the data through the communication mode determined by a user. Thereby, the invention can benefit users with freer and more convenient communication service.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method of transmitting a message through mobile communication equipment, the mobile communication equipment having a first communication mode and a second communication mode, the method comprising the steps of:
   (a) determining whether the mobile communication equipment is required to transmit the message by the first communication mode or the second communication mode, the message conforming to a first format related to the first communication mode; and
   (b) adjusting the message according to a second format related to the second communication mode to generate an adjusted message, and transmitting the adjusted message by the second communication mode when the mobile communication equipment is required to transmit the message by the second communication mode;
   wherein the step (b) further comprises:
   (b1) determining whether a language of the message is a first language or a second language;
   (b2) determining whether a length of the message is longer than a first length in the second format when the language of the message is the first language;
   (b3) dividing the message into a first message and a second message according to the first length when the length of the message is longer than the first length, wherein the adjusted message including the first message and the second message;
   (b4) determining whether the length of the message is longer than a second length in the second format when the language of the message is the second language; and
   (b5) dividing the message into a third message and a fourth message according to the second length when the length of the message is longer than the second length, wherein the adjusted message including the third message and the fourth message.

2. The method of claim 1, further comprising the step of (c) transmitting the message by the first communication mode when the mobile communication equipment is required to transmit the message by the first communication mode.

3. The method of claim 1, wherein the step (b) further comprises:
   (b6) setting the message as the adjusted message when the language of the message is the second language and the length of the message is shorter than or equivalent to the second length.

4. The method of claim 1, wherein the first language is Chinese, and the second language is English.

5. The method of claim 1, wherein the first communication mode is a PHS mode or a CDMA mode, and the second communication mode is a GSM mode.

6. A mobile communication equipment, the mobile communication equipment being capable of transmitting a message and having a first communication mode and a second communication mode, the mobile communication equipment comprising:
   a determining module, for determining whether the mobile communication equipment is required to transmit the message by the first communication mode or the second communication mode, the message conforming to a first format related to the first communication mode;
   an adjusting module, when the mobile communication equipment is required to transmit the message by the second communication mode, the adjusting module adjusting the message according to a second format related to the second communication mode to generate an adjusted message; and
   a transmitting module, when the mobile communication equipment is required to transmit the message by the second communication mode, the transmitting module transmitting the adjusted message by the second communication mode,
   wherein the adjusting module further comprises:
   a language determining unit, for determining whether a language of the message is a first language or a second language;
   a length determining unit, when the language of the message is the first language, the length determining unit determining whether a length of the message is longer than a first length in the second format; and
   an adjusting unit, when the length of the message is longer than the first length, the adjusting unit dividing the message into a first message and a second message according to the first length, the adjusted message including the first message and the second message;
   when the language of the message is the second language, the length determining unit determines whether the length of the message is longer than a second length in the second format; when the length of the message is longer than the second length, the adjusting unit divides the message into a third message and a fourth message according to the second length, the adjusted message includes the third message and the fourth message.

7. The mobile communication equipment of claim 6, wherein when the mobile communication equipment is required to transmit the message by the first communication mode, the transmitting module transmits the message by the first communication mode.

8. The mobile communication equipment of claim 6, wherein when the language of the message is the second language, and the length of the message is shorter than or equivalent to the second length, the adjusting unit sets the message as the adjusted message.

9. The mobile communication equipment of claim 6, wherein the first language is Chinese, and the second language is English.

10. The mobile communication equipment of claim 6, wherein the first communication mode is a PHS mode or a CDMA mode, and the second communication mode is a GSM mode.

11. A method of transmitting message through mobile communication equipment, the mobile communication equipment having a first communication mode and a second communication mode, the method comprising the steps of:
   (a) determining whether the mobile communication equipment is required to transmit the message by the first communication mode or the second communication mode, the message conforming to a first format related to the first communication mode; and
   (b) adjusting the message according to a second format related to the second communication mode to generate an adjusted message, and transmitting the adjusted message by the second communication mode when the mobile communication equipment is required to transmit the message by the second communication mode,
   wherein the step (b) further comprises:
   (b1) determining whether a language of the message is a first language or a second language;

(b2) determining whether a length of the message is longer than a first length in the second format when the language of the message is the first language;

(b3) dividing the message into a first message and a second message according to the first length when the length of the message is longer than the first length, wherein the adjusted message including the first message and the second message;

(b4) determining whether the length of the message is longer than a third length in the second format when the language of the message is a combination of the first language and the second language; and (b5) dividing the message into a fifth message and a sixth message according to the third length when the length of the message is longer than the third length, wherein the adjusted message including the fifth message and the sixth message.

12. The method of claim 11, further comprising the step of:

(c) transmitting the message by the first communication mode when the mobile communication equipment is required to transmit the message by the first communication mode.

13. The method of claim 11, wherein step (b) further comprises:

(b6) setting the message as the adjusted message when the language of the message is the combination of the first language and the second language with the length of the message shorter than or equivalent to the third length.

14. The method of claim 11, wherein the first language is Chinese, and the second language is English.

15. The method of claim 11, wherein the first communication mode is a PHS mode or a CDMA mode, and the second communication mode is a GSM mode.

16. A mobile communication equipment, the mobile communication equipment being capable of transmitting message and having a first communication mode and a second communication mode, the mobile communication equipment comprising:

a determining module, for determining whether the mobile communication equipment is required to transmit the message by the first communication mode or the second communication mode, the message conforming to a first format related to the first communication mode;

an adjusting module, when the mobile communication equipment is required to transmit the message by the second communication mode, the adjusting module adjusting the message according to a second format related to the second communication mode to generate an adjusted message; and a transmitting module, when the mobile communication equipment is required to transmit the message by the second communication mode, the transmitting module transmitting the adjusted message by the second communication mode;

wherein the adjusting module further comprises:

a language determining unit, for determining whether a language of the message is a first language or a second language;

a length determining unit, when the language of the message is the first language, the length determining unit determining whether a length of the message is longer than a first length in the second format; and an adjusting unit, when the length of the message is longer than the first length, the adjusting unit dividing the message into a first message and a second message according to the first length, the adjusted message including the first message and the second message;

when the language of the message is a combination of the first language and the second language, the length determining unit determines whether the length of the message is longer than a third length in the second format; when the length of the message is longer than the third length, the adjusting unit divides the message into a fifth message and a sixth message according to the third length, the adjusted message includes the fifth message and the sixth message.

17. The mobile communication equipment of claim 16, wherein when the mobile communication equipment is required to transmit the message by the first communication mode, the transmitting module transmits the message by the first communication mode.

18. The mobile communication equipment of claim 16, wherein when the language of the message is the combination of the first language and the second language with the length of the message shorter than or equivalent to the third length, the adjusting unit sets the message as the adjusted message.

19. The mobile communication equipment of claim 16, wherein the first language is Chinese, and the second language is English.

20. The mobile communication equipment of claim 16, wherein the first communication mode is a PHS mode or a CDMA mode, and the second communication mode is a GSM mode.

* * * * *